US007639671B2

(12) United States Patent
Zwernemann et al.

(10) Patent No.: US 7,639,671 B2
(45) Date of Patent: Dec. 29, 2009

(54) ALLOCATING PROCESSING RESOURCES FOR MULTIPLE INSTANCES OF A SOFTWARE COMPONENT

(75) Inventors: Brad L. Zwernemann, Austin, TX (US); Roman A. Dyba, Austin, TX (US); Perry P. He, Austin, TX (US); Lucio F. C. Pessoa, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 471 days.

(21) Appl. No.: 11/369,737

(22) Filed: Mar. 7, 2006

(65) Prior Publication Data
US 2007/0211743 A1 Sep. 13, 2007

(51) Int. Cl.
*H04L 12/66* (2006.01)
(52) U.S. Cl. ............................. 370/352; 705/34; 706/47; 709/224; 709/225
(58) Field of Classification Search .................. 370/352; 705/34; 706/47; 709/224, 245
See application file for complete search history.

(56) References Cited

U.S. PATENT DOCUMENTS

| 6,876,992 | B1 * | 4/2005 | Sullivan ................. 706/47 |
| 7,127,524 | B1 * | 10/2006 | Renda et al. ................. 709/245 |
| 7,222,192 | B2 * | 5/2007 | Allison et al. ............... 709/245 |
| 7,392,310 | B2 * | 6/2008 | Motoyama et al. ........... 709/224 |
| 2002/0165993 | A1 * | 11/2002 | Kramer ................. 709/315 |
| 2003/0081764 | A1 | 5/2003 | Kosanovic et al. |
| 2004/0210903 | A1 | 10/2004 | Kosanovic et al. |
| 2005/0234935 | A1 * | 10/2005 | Barsness et al. ............. 707/100 |
| 2006/0036520 | A1 * | 2/2006 | O'Neill ................. 705/34 |

FOREIGN PATENT DOCUMENTS

WO WO 00/50991 8/2000

OTHER PUBLICATIONS

Microsoft Press Computer Dictionary, Second Edition, 1994 pp. 139.*

* cited by examiner

*Primary Examiner*—Quynh H Nguyen
(74) *Attorney, Agent, or Firm*—Charles W. Bethards

(57) ABSTRACT

Methods and corresponding systems for allocating processing resources for a number of instances (N) of a software component include determining an average processing cost ($\mu$) and a variance ($\sigma^2$) for the software component. Then a processing cost for the software component is estimated as a function of N, the average processing cost ($\mu$), and the variance ($\sigma^2$), and processing resources are allocated in response to the estimated processing cost. The software component can be partitioned into a number of blocks (L), wherein the L blocks include a required block and one or more optional blocks. In some embodiments in response to a total estimated processing cost exceeding an available processing value, selected optional blocks can be disabled to reduce the total estimated processing cost to a value equal to or less than the available processing value. The optional blocks can be prioritized and disabled in order of priority.

20 Claims, 3 Drawing Sheets

ALLOCATING PROCESSING RESOURCES FOR MULTIPLE INSTANCES OF A SOFTWARE COMPONENT

FIELD OF THE INVENTION

This invention relates in general to allocating data processing resources in a data processing system, and more specifically to techniques and apparatus for allocating data processing resources for a number of instances of a software component using statistical analysis.

BACKGROUND OF THE INVENTION

In a voice or video communication system, data processing resources, such as processor cycles or processing time, is frequently allocated among multiple instances of a software component, where such instances are created to handle multiple communication channels. For example, a voice communications system such as a telephone system can include multiple instances of a software component that cancels echoes in signals transmitted over various channels. One method of allocating processing resources to a channel is to compute the worst-case requirement for each channel, and allocate the worst case number of cycles to each channel.

In many voice or video communications systems, these multiple instances of software components are of the type that can tolerate certain losses of data, or a certain amount of unprocessed data, without significantly affecting a quality of service level. For example, if the echoes in one frame of voice data were not precisely canceled, the user will probably not notice, and parameters that set the quality of service will probably not be violated.

Since data processing resources, such as processing cycles, are likely an expensive addition to the design of data communication equipment, it is desirable to maximize the use of the available data processing resources, and to provide a maximum level of data processing service with a minimum level of data processing resources.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

DETAILED DESCRIPTION

Figure 1:
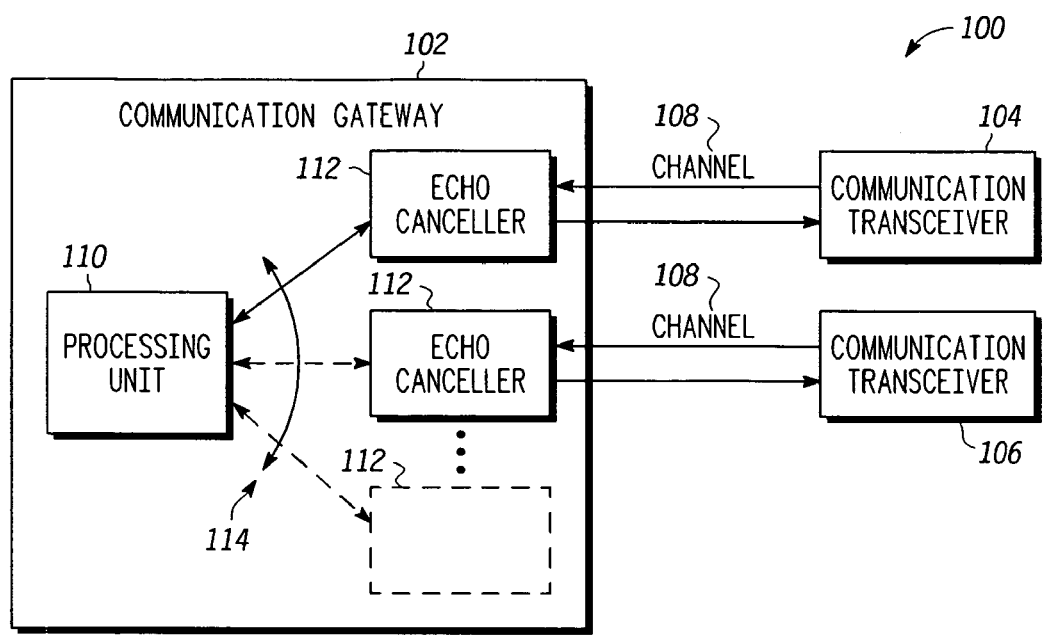
FIG. 1 depicts, in a simplified and representative form, a high-level diagram of a communications network for connecting communication transceivers in accordance with one or more embodiments.

In overview, the present disclosure concerns allocating processing resources of a data processing unit in accordance with statistically based estimated processing requirements. More particularly various inventive concepts and principles embodied in methods and apparatus may be used for scalably controlling and allocating resources of a data processing unit among multiple instances of a software component in response to statistical characterizations of the software component.

While the processing resource allocation system of particular interest may vary widely, one embodiment may advantageously be used in a communication system for processing data in multiple channels, wherein such processing can include, for example, echo cancellation, filtering, data processing enhancement, noise reduction, automatic level control, video processing, and the like. However, the inventive concepts and principles taught herein may be advantageously applied to other data processing systems wherein a processing unit allocates processing resources to multiple instances of software that are executing an application that can tolerate sporadic degradation of data without significantly affecting quality of service (QoS). Such systems can exploit the statistical properties of data traffic to achieve a statistical multiplexing processing resource gain, which increases average system utilization to increase channel or function density on embedded systems.

The instant disclosure is provided to further explain, in an enabling fashion, the best modes, at the time of the application, of making and using various embodiments in accordance with the present invention. The disclosure is further offered to enhance an understanding and appreciation for the inventive principles and advantages thereof, rather than to limit the invention in any manner. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles are best implemented with, or in, integrated circuits (ICs), including possibly application specific ICs, or ICs with integrated processing controlled by embedded software or firmware. It is expected that one of ordinary skill—notwithstanding possibly significant effort and many design choices motivated by, for example, available time, current technology, and economic considerations—when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring now to FIG. 1, a high-level diagram of a communication network for connecting communication transceivers in accordance with one or more embodiments will be briefly discussed and described. In FIG. 1, system 100 includes communication gateway 102 and communication transceivers 104 and 106. In one exemplary embodiment, communication gateway 102 is a central office in a communication network, such as a telephone system, wherein communication gateway 102 processes data for multiple communication transceivers, such as 104 and 106. Communication transceivers 104 and 106 can be terminal equipment, such as a telephone or videophone, or the like. Communication transceivers 104 and 106 are coupled to communication gateway 102 via a communication channel 108, which channel can be, in a typical embodiment, a two-line or four-line copper wire or transmission line.

Communication gateway 102 uses processing unit 110 to process data or signals received or transmitted to the multiple connected communication transceivers 104 through 106. When data processing unit 110 processes data for multiple channels, an instance of a software component can be created for each channel, as illustrated by instances of echo canceller 112. An instance of a software component has instance data (i.e., component data) stored in instance memory (i.e., component memory), which are spawned or created as new channels are needed. Each instance of the software component is analogous to a parallel task executed in a multitasking processor system, wherein a single processor shares time or processor cycles (measured in terms of million instructions per second (MIPS) or million cycles per second (MCPS)) according to a schedule so that tasks are said to be run in "parallel."

An example of a processing task that can be performed on each communication channel is echo cancellation. Echoes, which are delayed reflections of a communications signal, can appear in the communication channel because of impedance mismatches, or because of acoustical leakage from a telephone speaker to a telephone microphone. Thus, echo canceller software components 112 are created as needed to support communication transceivers (e.g., telephones) as new calls are initiated and channel 108 connections are added to communication gateway 102. Switch 114 schematically represents the multitasking, or the timesharing, or the cycle sharing of the processing resources of processing unit 110, wherein the processing resources are measured in MIPS, MCPS, time slices, or other similar measures of resource allocation.

Figure 2:
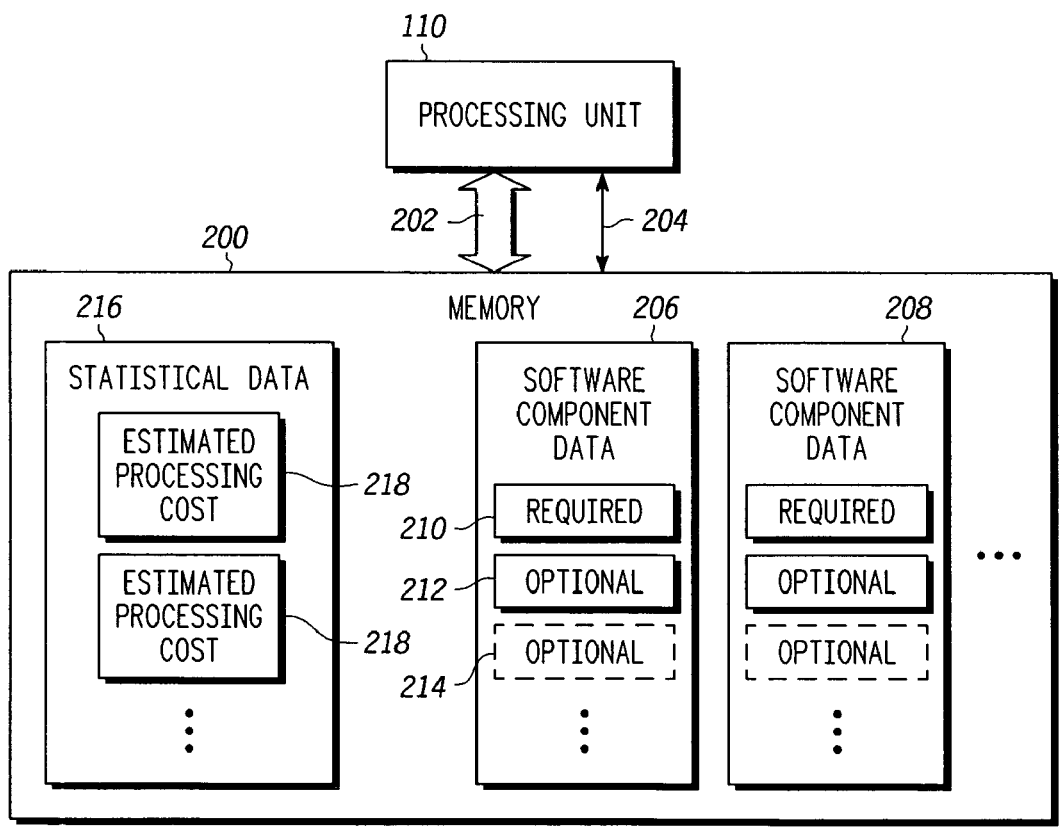
FIG. 2 shows a model of a processing unit coupled to a memory that stores data associated with a plurality of instances of a software component in accordance with one or more embodiments.

FIG. 2 shows processing unit 110 coupled to memory 200 by data bus 202 and various control signals 204. Memory 202 stores data associated with a plurality of instances of a software component. For example, areas of memory 200 are used to store data associated with a first software component 206 and a second software component 208, and other similar components as they arise. Within the memory area for the first software component 206 there can be further sections of memory for storing data associated with subparts (e.g., blocks) of the software component, wherein some blocks 210 are required and some blocks 212 and 214 are optional.

Other areas of memory 200 can be used to store statistical data 216, including estimated processing costs 218 associated with each software component. As will be discussed in greater detail below, software component data 206 and 208 represents data stored in memory 200 that is used to support separate instances of a software component, such as the software components for echo cancellation 112 (see FIG. 1). Statistical data 216 represents data stored in memory 200 that supports the allocation of processing resources of processing unit 110 in accordance with one or more embodiments, as discussed below in greater detail. By way of example, the statistical data 216 can include one or more statistical parameters normally associated with statistical variables. While the balance of this disclosure will largely focus on mean or average and variance, the statistical parameters can include one or more of an average or mean or other measurements of an average, e.g., median or the like, and assessments of dispersion of the distribution of the variables, e.g., variance, standard deviation, or other measurements of dispersion and the like.

Figure 3:
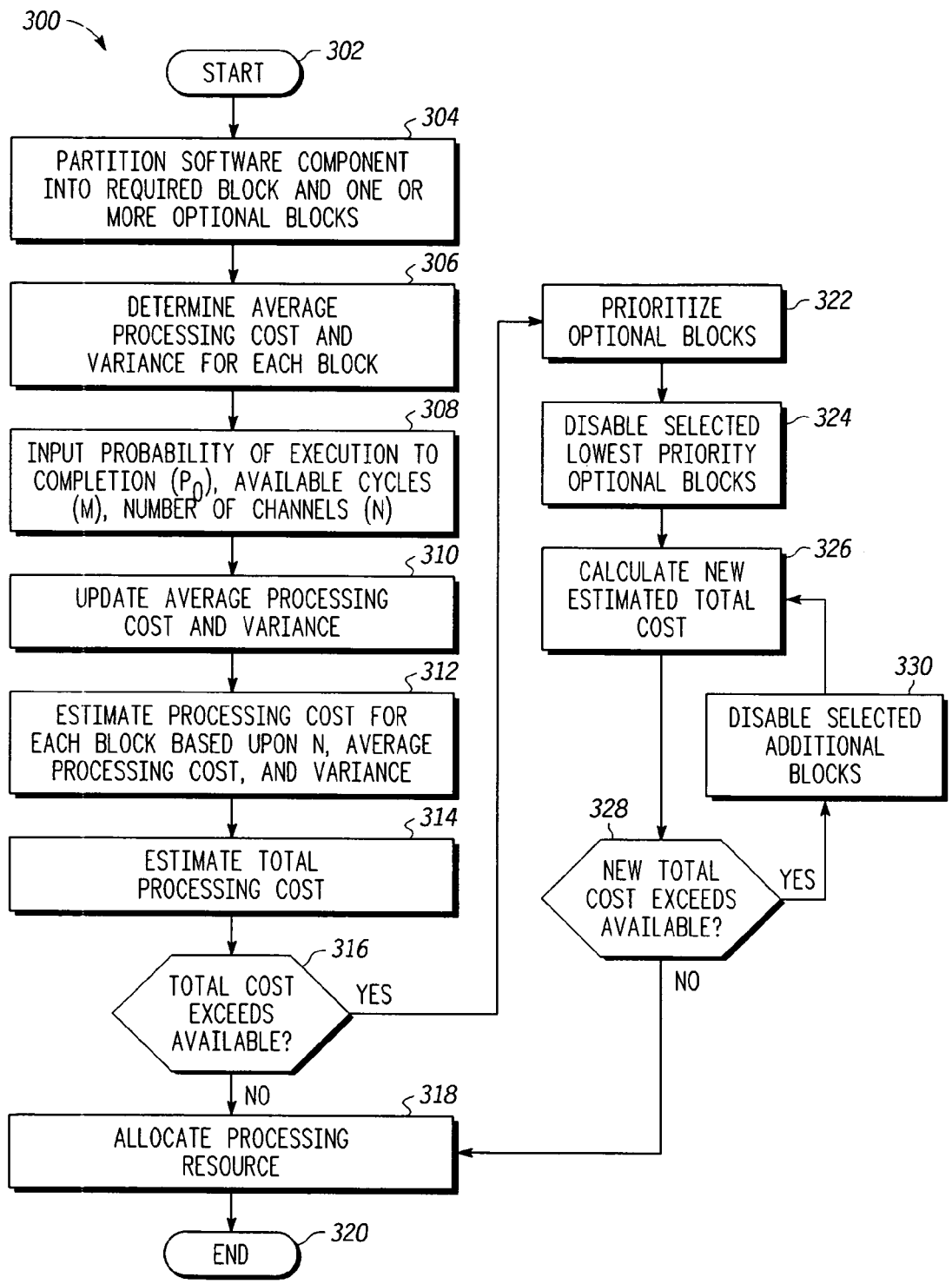
FIG. 3 is a high-level flowchart of processes executed by a processing unit for allocating processing resources in accordance with one or more embodiments.

With reference now to FIG. 3, there is depicted a high-level flowchart of processes executed by a processing unit, such as the processing unit shown in FIGS. 1 and 2, or other similar apparatus, for allocating processing resources in accordance with one or more embodiments.

Note that several blocks in FIG. 3 may be completed before beginning the iterative process of allocating processing resources for each processing period. For example, as will be described more completely below, "software components" may be partitioned into "required blocks" (see 210) and "optional blocks" (see 212, 214) as the system for resource allocation is designed, rather than, for example, during each data frame while processing a voice signal.

As illustrated, process 300 begins at 302, and thereafter passes to 304, wherein the process partitions a software component into a required block and one or more optional blocks. The software component can be an instance of a software process that is created and is executed on a per channel basis in a multichannel communication gateway. Thus, if a processing unit is responsible for the processing of data for ten channels, there will typically be ten instances or copies of the same or similar software component data being processed in a multitasked parallel configuration.

A block can be a part of a software component and can represent a distinct sub-function of the overall function performed by the software component. For example, in one embodiment the software component may have the function of echo cancellation, while a block in the software component may have the sub-function of filtering the audio signal, or enhancing the audio signal, or executing some other function that is smaller than the whole.

One of the blocks can be identified as a required block. The required block executes the basic function of the overall software component. Without executing the required block, the function of the software component will not be accomplished. In the example of the echo cancellation software component, the required block can be the basic echo canceling software.

Other blocks in the software component can be identified as optional blocks. Optional blocks are not required to execute at all times that the required block is executed to perform its function. Optional blocks can add features, or improve quality, or otherwise improve or add to the functioning of the software component. In the echo cancellation software component, the optional blocks can perform filtering, filter coefficient updates, noise suppression, noise matching, or other such functions that enhance echo cancellation, but they are not required to execute every time the basic echo cancellation function is executed.

As mentioned above, this process of partitioning the software component may be completed in a design phase conducted by the manufacturer, rather than being conducted in each period for which processing resources are allocated.

The next step in the process is to determine an average processing cost and a variance for each of the blocks, as illustrated at 306. In one embodiment, the blocks can be extensively profiled using representative test signals (i.e., independent test vectors) to estimate the average and variance of execution times. Execution times can be measured in terms of MCPS, and execution time profiles can be characterized by MCPS histograms, h(m), so that the average MCPS (μ) and variance MCPS ($\sigma^2$) are estimated using the first and second moments of h(m).

In the formulas below, m is a random variable representing the processing load per block, and the histogram $h_i(m)$ is estimated as a function of m MCPS such that $\Sigma_m h_i(m)=1$. Then the average MCPS (μ) and variance MCPS ($\sigma^2$) are calculated according to the following formulas:

$$\mu_i = \sum_m m h_i(m)$$

$$\sigma_i^2 = \sum_m m^2 h_i(m) - \mu_i^2$$

Initial values for average processing cost and variance for each block may be computed by the manufacturer of the processing resource allocation system. The initial values for average processing cost and variance can be stored in memory, such as memory 200 shown in FIG. 2, which corresponds to lookup table 404 in the high-level functional block diagram of FIG. 4. Look up table 404 can be used to store statistical constants that have been predetermined using test vectors.

Figure 4:
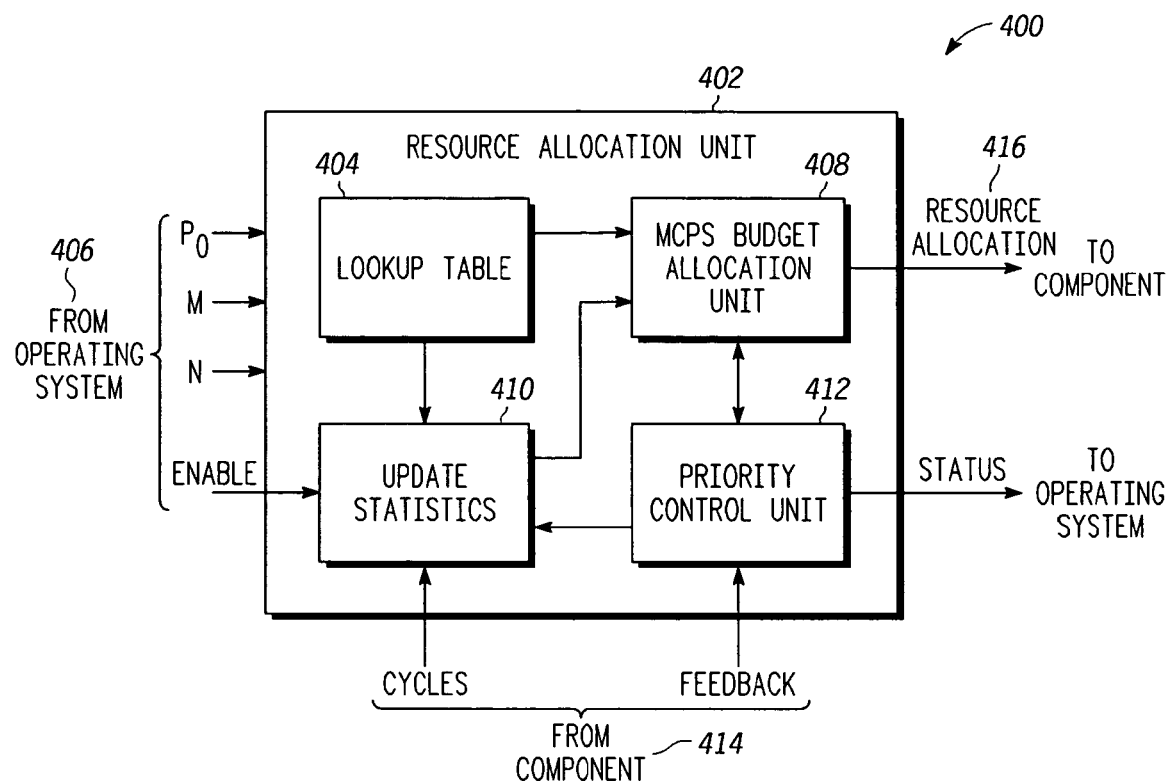
FIG. 4 shows a high-level functional block diagram of a resource allocation unit that may be used to allocate processing resources in conjunction with the systems of FIGS. 1 and 2 in accordance with one or more embodiments.

Referring briefly to FIG. 4 there is depicted a functional block diagram of the several tasks that are performed and interfaces maintained by composite resource allocation unit 400. The functions shown in resource allocation unit 402 can be executed in hardware, firmware, or application specific integrated circuits that more specifically resemble the processing unit 110 coupled to memory 200 in FIG. 2. The remaining blocks in resource allocation unit 402 will be explained in greater detail below, as such blocks can be used in the implementation of the remaining steps in FIG. 3.

Returning to FIG. 3, the next step in the process receives, as inputs, the probability of execution to completion ($P_0$), the available number of cycles (M), and the number of channels (N), as depicted at 308. In FIG. 4, such inputs are shown as operating system inputs 406, which are sent to resource allocation unit 402.

The probability of execution $P_0$ is a predefined target confidence level reflecting the statistical likelihood that a multichannel system running several independent software components will not exceed a predefined target execution time or cycle budget M. $P_0$ is the probability that the total MCPS consumption in the system is smaller than or equal to M, which can be expressed as $P_o=\text{Prob}(m \leq M)$, where m is modeled as a Normal distribution $\mathcal{N}(N\mu_t, N\sigma_t^2)$ for the total number of blocks in all software components. Because a failure to complete a software task within an allotted number of cycles can have an impact on the quality of service, $P_0$ is selected in accordance with a quality of service required by the processing unit. An increasing probability that a task will not be completed decreases the quality of service.

Thus, $P_0$ can be expressed by the following formulas:

$$P_o = \text{Prob}(m \leq M)$$
$$= \text{Prob}\left(\frac{m - N\mu_t}{\sqrt{N}\,\sigma_t} \leq \frac{M - N\mu_t}{\sqrt{N}\,\sigma_t}\right)$$
$$= \text{Prob}(m' \leq \alpha_o)$$

Where m' is a random variable having distribution N (0, 1) and $$\alpha_o = \frac{M - N\mu_t}{\sqrt{N}\,\sigma_t}$$

This implies that $$P_0 = \frac{1}{2}\left[1 + \text{erf}(\alpha_0/\sqrt{2})\right]$$

where $$\text{erf}(x) = \frac{2}{\sqrt{\pi}} \int_0^x e^{-t^2}\,dt.$$

It is important to mention that when the Normal distribution approximation is not adequate, one may use the Tchebysheff's inequality to estimate an upper bound on the likelihood of exceeding the available MCPS budget as follows:

$$\text{Prob}\left(\left|\frac{m - N\mu_t}{\sqrt{N}\,\sigma_t}\right| \geq \alpha_o\right) \leq \frac{1}{\alpha_o^2}$$

Note that these approximations have been experimentally validated using statistically independent communication channels indicating very close agreement with theoretical predictions as the number of channels N increases.

The input M at 308 is the available number of cycles of the data processing unit, e.g., a digital signal processor (DSP). This may be referred to as the budgeted processing resource, which is typically measured in MCPS.

The input number of channels N is the number of channels that the processing unit is expected to handle. This is typically the number of instances of the software component that are needed to handle all the data processing. In some embodiments of an echo canceller, N can be the number of active phone calls.

Next, the process can perform an optional step of updating the average processing cost and variance or other statistical parameters, as illustrated at 310. In one embodiment, the average processing cost and variance for each block (required and optional) are calculated before the process of allocating processing resources begins. After the processes have been started, the average processing cost and variance can be updated periodically by measuring the average processing cost and variance over a recent time window, e.g., over hundreds of samples. By updating the average cost and variance, the calculations and the process of allocating processing resources can become more accurate for the particular environment in which the system is used.

As shown in FIG. 4, the process of updating statistics may be implemented within resource allocation unit 402 in an update statistics block 410. To update the average processing cost and variance statistics, the process monitors the number of cycles (obtained via each software component 414) required by each block, and calculates a corresponding average and variance accordingly. The process of measuring the number of cycles required by a block can be implemented in the operating system.

Next, the process 300 estimates the processing cost $m_i$ for each block based on the number of channels N, and the average processing cost $\mu_i$ and the standard deviation $\sigma_i$ for each block, as depicted at flowchart block 312. In one embodiment, based on the previous equations of $\alpha_0$ and $P_0$, the estimated processing cost for each block $m_i$ of L number of blocks can be calculated according to the formula:

$$m_i = \mu_i + \alpha \cdot \sigma_i \quad \text{for } i = 0, \ldots, L-1$$

$$\text{where } \alpha = \frac{\sqrt{2}\, \text{erf}^{-1}(2 \cdot P_0 - 1)}{\sqrt{N}}.$$

Thus, α is a statistical scaling factor that is a function of a selected probability of completion $P_0$ of the blocks, and the number of channels N. This makes the estimate of the processing cost a function of N, the average processing cost, and the variance for each block.

After estimating the processing cost for each block, the process estimates the total processing cost for all blocks in all N channels, as illustrated at 314. This can be implemented by summing all of the estimated processing cost $m_i$ for each of the L blocks, and multiplying by N, which is the number of channels. This step can be implemented in processing unit 110 (see FIG. 2) by the budget allocation unit 408 (see FIG. 4).

Once the total processing cost is estimated, the process determines whether the estimated total processing cost exceeds the available processing resources, as depicted in 316. If the total estimated processing cost does not exceed the available processing resources, the process passes to 318, wherein the processing resources are allocated. Since there will not be a shortage of processing resources, there are no difficult decisions concerning how to cut back the allocations to the various blocks or components.

However, if, at 316, the total estimated processing cost exceeds the available processing resources, the process passes to 322, wherein the optional blocks are prioritized. The prioritization can be implemented in priority control unit 412 in FIG. 4. In some embodiments, block prioritization can occur based on several factors or considerations. In one embodiment, the optional blocks can be prioritized according to their impact on the quality of service. For example, if voice data is being processed, some optional blocks may contribute greatly to the perceived quality of the voice, while other optional blocks are hardly noticed if they were not executed. In other embodiments, the optional blocks may be prioritized according to the number of cycles needed to execute the optional block. In some embodiments, some blocks can initially have a higher priority, and then be changed to a lower priority as the process of allocating resources proceeds. For example, updating the coefficients of an adaptive filter can initially have a high priority, and then be changed to a lower priority as the filter converges. Additionally, the priorities of optional blocks may be periodically changed or evaluated based on feedback 414 from the optional blocks, wherein such feedback may include an indication of whether or not the execution of the block was completed with previously allocated resources.

Once the optional blocks are prioritized, the process disables selected lowest priority optional blocks, as depicted at 324. In one embodiment, the lowest priority block can be disabled in the software component for one or several of the N channels.

After disabling selected low priority optional blocks, the process calculates a new estimate of the total processing cost, as illustrated at 326. Then, the new total estimated processing cost is compared to the available processing resources, and the process once again determines whether or not the new estimated processing cost exceeds the available processing resources, as depicted at 328.

If the new estimated total processing cost does not exceed the processing resources available, the process proceeds to 318 to allocate the processing resources according to the selection of enabled and disabled optional blocks. In one embodiment, the allocation of resources can take the form of control signals that enable and disable the execution of selected optional blocks of the N software components. In FIG. 4, this allocation is shown as resource allocation 416, which is output from MIPS/MCPS budget allocation unit 408.

If the new total estimated cost exceeds the available processing resources, the process disables additional selected low priority optional blocks, as illustrated at 330. Then the process iteratively returns to block 326 to calculate a new estimated total processing cost, and to determine if the new total falls within the available processing resources.

In some embodiments, the iterative process of selecting and disabling low priority optional blocks (324 and 330) may be implemented wherein a single optional block for a single software component instance is disabled before estimating a new estimated total cost and comparing it to the available processing resources. In other words, the process may proceed by disabling one optional block in one software component instance at a time. In alternative embodiments, groups of selected low priority optional blocks may be disabled in one or more selected software components before calculating and comparing a new estimate of the total cost.

The above described functions and structures can be implemented in one or more integrated circuits. For example, many or all of the functions can be implemented in the signal and data processing circuitry that is suggested by the block diagrams shown in FIGS. 1, 2, and 4. Furthermore, a similar method and structure can be used for allocating processing resources of multiple instances of more that one type of software component.

The processes, apparatus, and systems, discussed above, and the inventive principles thereof are intended to produce an improved and more efficient allocation of data processing resources. By selecting the appropriate probability $P_0$ that a software component will be completed, the processing resource allocation can be performed efficiently, with gains in processing density achieved by sacrificing an appropriate incremental level of quality that results when all the blocks of each software component cannot be completely executed. Additional efficiencies are gained when a software component is subdivided into prioritized optional blocks that can be selectively disabled to meet the available or budgeted processing resources. Selectively disabling optional blocks can gracefully degrade the system in a controlled and predictable fashion. If the available MIPS/MCPS and the number of channels are large enough, then using statistical provisioning can provide a multiplexing gain per channel proportional to the difference between the total peak and average MIPS/MCPS.

While the embodiments discussed above primarily relate to allocating processor cycles to an echo cancellation software component, the system for allocating processor resources to multiple instances of a software component can be used in other data processing applications, such as signal processing and filtering, video processing, graphics processing, character or object recognition, or other similar processes that are executed in parallel, and that can tolerate sporadic errors without significantly affecting the quality of service. If such processes can be subdivided into required and optional blocks, wherein optional blocks may be selectively disabled, additional statistical processing gain can be achieved. While this description and disclosure has focused on the average or mean and variance parameters, it will be appreciated that other statistical parameters corresponding to various averages, e.g., median or the like, and distribution dispersion, e.g., standard deviation or the like can also be used for advantageously allocating processor resources in accordance with corresponding statistical measurements.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for allocating processing resources for a number of instances (N) of a software component and a probability of completion (Po) comprising:
    in a processing unit;
    determining an average processing cost ($\mu$) and a variance ($\sigma^2$) for the software component;
    estimating a processing cost for the software component as a function of N, the probability of completion (Po), the average processing cost ($\mu$), and the variance ($\sigma^2$); and
    allocating processing resources in response to the processing cost.

2. The method for allocating processing resources according to claim 1 wherein the estimating a processing cost for the software component, and the allocating processing resources, comprises:
    partitioning the software component into a number of blocks (L blocks), wherein the L blocks include at least one required block and one or more optional blocks;
    determining an average processing cost ($\mu_i$) and a variance ($\sigma_i^2$) for each of the L blocks;
    estimating an estimated processing cost ($m_i$) for each of the L blocks as a function of N, and the respective average processing cost ($\mu_i$) and variance ($\sigma_i^2$) of the L blocks; and
    allocating processing resources in response to the estimated processing cost $m_i$ for each of the L blocks.

3. The method for allocating processing resources according to claim 2 wherein the estimating an estimated processing cost ($m_i$) for each of the L blocks comprises:
    computing a scaling factor ($\alpha$) that is a function of N and the probability of completion ($P_0$) of the L blocks; and
    estimating an estimated processing cost ($m_i$) for each of the L blocks as a function of N, the probability of completion ($P_0$), and the respective average processing cost ($\mu_i$) and variance ($\sigma_i^2$) for each of the L blocks according to the formula $m_i = \mu_i + \alpha \cdot \sigma_i$.

4. The method for allocating processing resources according to claim 3 further comprising selecting the probability of completion ($P_0$) to achieve a quality of service (QoS) level.

5. The method for allocating processing resources according to claim 3 wherein the computing a scaling factor ($\alpha$) that is a function of N and the probability of completion ($P_0$) comprises computing the scaling factor ($\alpha$) according to the formula $$\alpha = \frac{\sqrt{2}\,\mathrm{erf}^{-1}(2 \cdot P_0 - 1)}{\sqrt{N}}.$$

6. The method for allocating processing resources according to claim 2 wherein the allocating processing resources comprises:
    adding the estimated processing cost $m_i$ for each of the L blocks in each of the N software components to compute a total estimated processing cost for the N software components;
    comparing the total estimated processing cost to an available processing value; and
    in response to the total estimated processing cost exceeding the available processing value, disabling selected optional blocks to reduce the total estimated processing cost to a value equal to or less than the available processing value.

7. The method for allocating processing resources according to claim 6 wherein disabling selected optional blocks comprises:
    prioritizing the optional blocks; and
    disabling a selected lower priority optional block before disabling a selected higher priority optional block.

8. The method for allocating processing resources according to claim 2 wherein the partitioning the software component into a number of blocks (L blocks), wherein the L blocks include at least one required block and one or more optional blocks comprises partitioning an echo canceller software component into L blocks, wherein the L blocks includes a required echo cancelling block and one or more optional quality-enhancing blocks.

9. The method for allocating processing resources according to claim 2 further comprising updating the average processing cost ($\mu_i$) and variance ($\sigma_i^2$) for one or more of the L blocks based upon measurements in a preceding time window.

10. A system for allocating processing resources for a number of instances (N) of a software component and a probability of completion (Po) comprising:
    a data memory for storing data associated with the N instances of the software component; and
    a processing unit coupled to the data memory, wherein the processing unit and the data memory are cooperatively operable for executing the N instances of the software component, and for:
        estimating an estimated processing cost for the software component as a function of N, the probability of completion (Po), an average processing cost ($\mu$) and a variance ($\sigma^2$) for the software component; and
        allocating processing resources in response to the estimated processing cost.

11. The system for allocating processing resources according to claim 10 wherein the software component is partitioned into a number of blocks (L blocks), wherein the L blocks include at lest one required block and one or more optional blocks, and wherein the processing unit and the data memory are further cooperatively operable for:

estimating a processing cost ($m_i$) for each of the L blocks as a function of N, and a respective average processing cost ($\mu_i$) and a variance ($\sigma_i^2$) of each of the L blocks; and allocating processing resources in response to the estimated processing cost $m_i$ of the L blocks.

12. The system for allocating processing resources according to claim 11 wherein the processing unit and the data memory are further cooperatively operable for:

computing a scaling factor ($\alpha$) that is a function of N and the probability of completion ($P_0$) of the L blocks; and estimating an estimated processing cost ($m_i$) for each of the L blocks as a function of N, the probability of completion ($P_0$), and the respective average processing cost ($\mu_i$) and variance ($\sigma_i^2$) for each of the L blocks according to the formula $m_i = \mu_i + \alpha \cdot \sigma_i$.

13. The system for allocating processing resources according to claim 12 wherein the probability of completion ($P_0$) is selected to achieve a quality of service (QoS) level.

14. The system for allocating processing resources according to claim 12 wherein the processing unit and the data memory are further cooperatively operable for computing the scaling factor ($\alpha$) according to the formula $$\alpha = \frac{\sqrt{2}\,\text{erf}^{-1}(2 \cdot P_0 - 1)}{\sqrt{N}}.$$

15. The system for allocating processing resources according to claim 11 wherein the processing unit and the data memory are further cooperatively operable for:

adding the estimated processing cost $m_i$ for each of the L blocks in each of the N software components to compute a total estimated processing cost for the N software components;

comparing the total estimated processing cost to an available processing value; and in response to the total estimated processing cost exceeding the available processing value, disabling selected optional blocks to reduce the total estimated processing cost to a value equal to or less than the available processing value.

16. The system for allocating processing resources according to claim 15 wherein the processing unit and the data memory are further cooperatively operable for:

prioritizing the optional blocks; and disabling a selected lower priority optional block before disabling a selected higher priority optional block.

17. The system for allocating processing resources according to claim 11 wherein the software component comprises an echo cancelling software component, and wherein the L blocks include a required echo cancelling block and one or more optional quality-enhancing blocks.

18. The system for allocating processing resources according to claim 11 wherein the processing unit and the data memory are further cooperatively operable for updating the average processing cost ($\mu_i$) and variance ($\sigma_i^2$) for one or more of the L blocks based upon measurements in a preceding time window.

19. A method for allocating processing resources for a number of instances (N) of a software component and a probability of completion (Po) comprising:

in a processing unit;

partitioning the software component into a number of blocks (L blocks), wherein the L blocks include at least one required block and one or more optional blocks;

determining an average processing cost ($\mu_i$) and a variance ($\sigma_i^2$) for each of the L blocks;

computing a scaling factor ($\alpha$) that is a function of N and the probability of completion ($P_0$) of the L blocks;

estimating an estimated processing cost ($m_i$) for each of the L blocks as a function of $\alpha$, and the respective average processing cost ($\mu_i$) and variance ($\sigma_i^2$) of the L blocks; and allocating processing resources in response to the estimated processing cost $m_i$ for each of the L blocks.

20. The method for allocating processing resources according to claim 19 comprising:

adding the estimated processing cost $m_i$ of each of the L blocks in each of the N software components to compute a total estimated processing cost for the N software components;

comparing the total estimated processing cost to an available processing value; and in response to the total estimated processing cost exceeding the available processing value, disabling selected optional blocks to reduce the total estimated processing cost to be equal to or less than the available processing value.

* * * * *